(12) United States Patent
Sharifipour et al.

(10) Patent No.: US 8,531,174 B2
(45) Date of Patent: Sep. 10, 2013

(54) AC-DC INPUT ADAPTER

(75) Inventors: Bahman Sharifipour, Westboro, MA (US); Kaiti Hu, Taipei (TW)

(73) Assignee: Flextronics AP, LLC, Broomfield, CO (US)

( * ) Notice: Subject to any disclaimer, the term of this patent is extended or adjusted under 35 U.S.C. 154(b) by 665 days.

(21) Appl. No.: 12/157,776

(22) Filed: Jun. 12, 2008

(65) Prior Publication Data

US 2009/0310384 A1 Dec. 17, 2009

(51) Int. Cl.
*H02M 3/156* (2006.01)

(52) U.S. Cl.
USPC .......................................... 323/351; 320/160

(58) Field of Classification Search
USPC .......... 363/146; 323/266, 318, 351; 320/134, 320/160–161
See application file for complete search history.

(56) References Cited

U.S. PATENT DOCUMENTS

| | | | |
|---|---|---|---|
| 4,184,197 A | 1/1980 | Cuk et al. | |
| 4,370,703 A | 1/1983 | Risberg | |
| 4,563,731 A | 1/1986 | Sato | |
| 4,645,278 A | 2/1987 | Yevak et al. | 339/17 T |
| 4,712,160 A | 12/1987 | Sato et al. | 361/388 |
| 4,788,626 A | 11/1988 | Neidig et al. | 361/386 |
| 4,806,110 A | 2/1989 | Lindeman | 439/108 |
| 4,823,249 A | 4/1989 | Garcia, II | |
| 4,841,220 A | 6/1989 | Tabisz et al. | |
| 4,857,822 A | 8/1989 | Tabisz et al. | |
| 4,866,367 A | 9/1989 | Ridley et al. | |
| 4,893,227 A | 1/1990 | Gallios et al. | 363/26 |
| 4,899,256 A | 2/1990 | Sway-Tin | 361/386 |
| 4,901,069 A | 2/1990 | Veneruso | 340/853 |
| 5,065,302 A | 11/1991 | Kanazawa | |
| 5,075,821 A | 12/1991 | McDonnal | |
| 5,090,919 A | 2/1992 | Tsuji | 439/519 |
| 5,101,322 A | 3/1992 | Ghaem et al. | 361/386 |
| 5,235,491 A | 8/1993 | Weiss | 361/694 |
| 5,325,283 A | 6/1994 | Farrington | |
| 5,365,403 A | 11/1994 | Vinciarelli et al. | 361/707 |

(Continued)

FOREIGN PATENT DOCUMENTS

| | | |
|---|---|---|
| GB | 2252208 A | 7/1992 |
| JP | 4217869 A | 8/1992 |

(Continued)

OTHER PUBLICATIONS

Hang-Seok Choi et al., Novel Zero-Voltage and Zero-Current-Switching (ZVZCS) Full-Bridge PWM Converter Using Coupled Output Inductor, 2002 IEEE, pp. 641-648.

(Continued)

*Primary Examiner* — Harry Behm
*Assistant Examiner* — Matthew Grubb
(74) *Attorney, Agent, or Firm* — Haverstock & Owens, LLP

(57) ABSTRACT

An output module for providing power to a device by using power from a source includes an inlet port, an outlet port, a power conversion circuit configured to receive power from the source through the inlet port and supply converted power to the device through the outlet port, and a control circuit coupled to the power conversion circuit and configured to determine a power requirement of the device and to operate the power conversion circuit to produce converted power having a parameter based upon the power requirement. Preferably, the power requirement is a charging requirement of a battery of the device.

32 Claims, 16 Drawing Sheets

(56) References Cited

U.S. PATENT DOCUMENTS

| | | |
|---|---|---|
| 5,373,432 A | 12/1994 | Vollin |
| 5,442,540 A | 8/1995 | Hua |
| 5,673,185 A | 9/1997 | Albach et al. |
| 5,712,772 A | 1/1998 | Telefus et al. |
| 5,786,992 A | 7/1998 | Vinciarelli et al. |
| 5,811,895 A | 9/1998 | Suzuki et al. ............... 307/125 |
| 5,838,554 A | 11/1998 | Lanni ............................ 363/21 |
| 5,859,771 A | 1/1999 | Kniegl |
| 5,905,369 A | 5/1999 | Ishii et al. |
| 5,923,543 A | 7/1999 | Choi ............................. 363/21 |
| 5,949,672 A | 9/1999 | Bertnet |
| 6,009,008 A | 12/1999 | Pelly |
| 6,183,302 B1 | 2/2001 | Daikuhara et al. ........... 439/608 |
| 6,272,015 B1 | 8/2001 | Mangtani ...................... 361/707 |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying |
| 6,390,854 B2 | 5/2002 | Yamamoto et al. .......... 439/620 |
| 6,452,816 B2 | 9/2002 | Kuranuki |
| 6,459,175 B1 | 10/2002 | Potega ........................... 307/149 |
| 6,549,409 B1 | 4/2003 | Saxelby et al. ............... 361/704 |
| 6,578,253 B1 | 6/2003 | Herbert ......................... 29/605 |
| 6,618,274 B2 | 9/2003 | Boylan et al. |
| 6,654,261 B2 | 11/2003 | Welches et al. |
| 6,721,192 B1 | 4/2004 | Yang et al. |
| 6,775,162 B2 | 8/2004 | Mihai et al. .................. 363/141 |
| 6,894,461 B1 | 5/2005 | Hack et al. |
| 6,899,434 B2 | 5/2005 | Morishita |
| 6,919,715 B2 | 7/2005 | Muratov et al. |
| 6,958,920 B2 | 10/2005 | Mednik et al. |
| 6,989,997 B2 | 1/2006 | Xu |
| 7,038,406 B2 | 5/2006 | Wilson |
| 7,102,251 B2 | 9/2006 | West |
| 7,202,640 B2 | 4/2007 | Morita |
| 7,208,833 B2 | 4/2007 | Nobori et al. ................. 257/704 |
| 7,239,532 B1 | 7/2007 | Hsu et al. |
| 7,274,175 B2 | 9/2007 | Manolescu |
| 7,386,286 B2 | 6/2008 | Petrovic et al. |
| 7,545,256 B2 | 6/2009 | O'Toole et al. |
| 7,596,007 B2 | 9/2009 | Phadke |
| 7,701,305 B2 | 4/2010 | Lin et al. |
| 8,102,678 B2 | 1/2012 | Jungreis |
| 8,126,181 B2 | 2/2012 | Yamamoto et al. |
| 8,155,368 B2 | 4/2012 | Cheung et al. |
| 2002/0008963 A1 | 1/2002 | Dibene, II et al. ........... 361/720 |
| 2002/0011823 A1 | 1/2002 | Lee ................................ 320/137 |
| 2002/0036200 A1 | 3/2002 | Ulrich |
| 2003/0035303 A1 | 2/2003 | Balakrishnan et al. ........ 363/16 |
| 2004/0008532 A1 | 1/2004 | Asawa |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1* | 6/2005 | Wilson ......................... 363/142 |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2006/0002155 A1 | 1/2006 | Shteynberg et al. |
| 2006/0022637 A1 | 2/2006 | Wang et al. |
| 2006/0109696 A1 | 5/2006 | Ren et al. |
| 2006/0152947 A1 | 7/2006 | Baker |
| 2006/0213890 A1 | 9/2006 | Kooken et al. |
| 2007/0040516 A1 | 2/2007 | Chen |
| 2007/0051712 A1 | 3/2007 | Kooken et al. |
| 2007/0121981 A1 | 5/2007 | Koh et al. |
| 2007/0138971 A1 | 6/2007 | Chen |
| 2007/0247877 A1 | 10/2007 | Kwon et al. |
| 2007/0263415 A1 | 11/2007 | Jansen et al. |
| 2008/0043496 A1 | 2/2008 | Yang |
| 2008/0191667 A1* | 8/2008 | Kernahan et al. ............. 320/150 |
| 2009/0290384 A1 | 11/2009 | Jungreis |
| 2010/0039833 A1 | 2/2010 | Coulson et al. |
| 2010/0322441 A1 | 12/2010 | Weiss et al. |

FOREIGN PATENT DOCUMENTS

| | | |
|---|---|---|
| JP | 10243640 A | 9/1998 |
| JP | 2000083374 A | 3/2000 |
| JP | 2000253648 A | 9/2000 |
| JP | 2004208357 A | 7/2004 |
| WO | WO 2005/122377 A1 | 12/2005 |

OTHER PUBLICATIONS

EE Times.com—"Team Claims Midrange Wireless Energy Transfer", by R. Colin Johnson, 4 pages, Nov. 6, 2007.

EE Times.com—"Wireless Beacon Could Recharge Consumer Devices", by R. Colin Johnson, 3 pages, Nov. 6, 2007.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

Office Action dated Apr. 18, 2012, U.S. Appl. No. 12/687,761, filed Jan. 14, 2010, Ex. Tran, Nguyen, 12 pages.

* cited by examiner

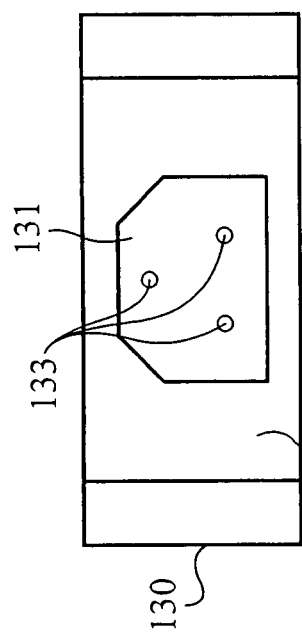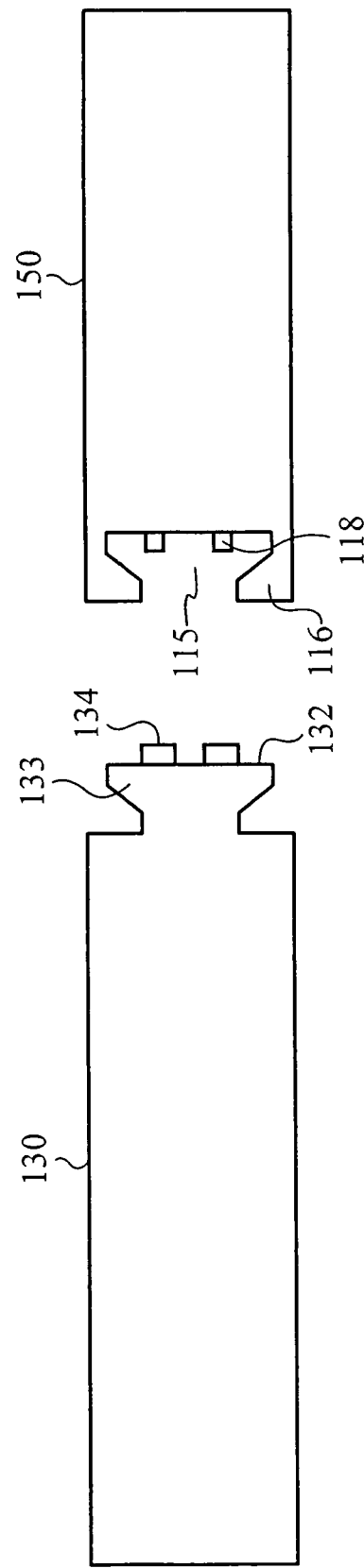

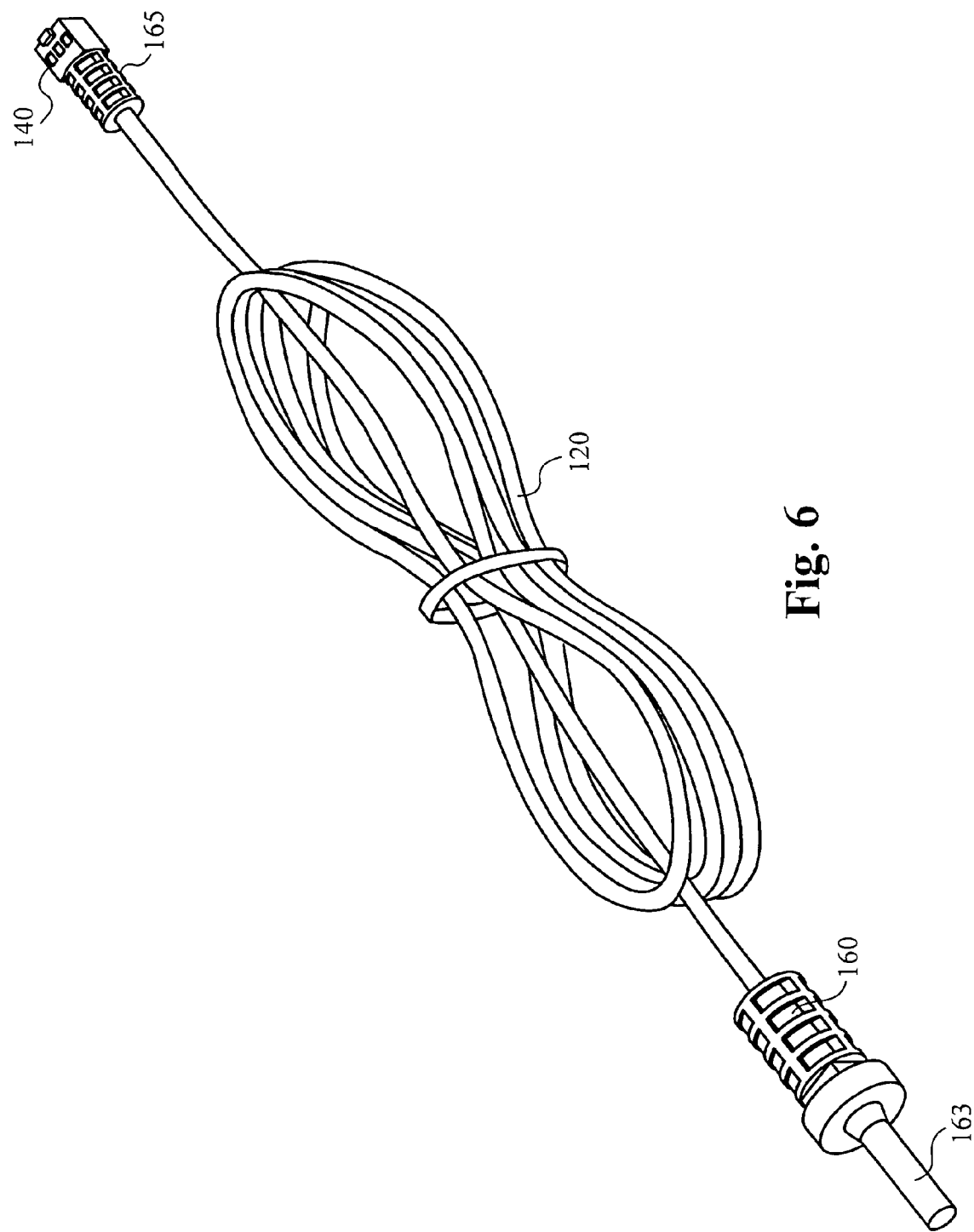

AC-DC INPUT ADAPTER

FIELD OF THE INVENTION

The present invention relates generally to the field of power adapters. More specifically, the present invention relates to a universal adapter that supplies power to a device based on a power requirement of the device.

BACKGROUND OF THE INVENTION

Generally, an electrical device has its own power requirements. For instance, laptops manufactured by different companies can have different voltage requirements. One laptop may require 19 volts to be operational, another may need 21 volts, and yet another may demand 23 volts. Unfortunately, this results in each brand and/or type of an electrical device having its own power adapter configured to provide power in accordance with the device's particular power requirements. Hence, it is not unusual to find a multitude of power adapters and cables running from several electrical devices to a power wall outlet in a family household.

The bulkiness and the associated inconvenience of storing a power adapter for each electrical device can be cumbersome and inconvenient. The inconvenience is even more apparent when one is forced to carry a power adapter for each electrical device, particularly with portable devices.

In addition, problems can arise if a power adapter for a laptop is lost during a trip. In such a circumstance it is virtually impossible to charge the battery of the laptop without first purchasing a replacement power adapter specifically designed for the laptop based on the power requirements for that laptop. Replacement power adapters for electronic devices, including portable devices, can prove to be costly and sometimes difficult to locate, especially, in a city away from home such as during business trips and vacations.

BRIEF SUMMARY OF THE INVENTION

Embodiments of the present invention relate to an output module for providing power to a device. Power from a source is coupled to an inlet port. Converted power is coupled from an outlet port. A power conversion circuit and a control circuit are coupled between the input port and the output port. The power conversion circuit is configured to receive power from the source through the inlet port and supply converted power to the device through the outlet port. The control circuit is coupled to the power conversion circuit and configured to determine a power requirement of the device and to operate the power conversion circuit to produce converted power having a parameter based upon the power requirement.

In addition, embodiments of the present invention relate to a universal power supply that includes an input connector which is configured to couple with a power source and an output connector which is configured to couple with a device. Further, the power supply includes a primary power conversion circuit configured to receive power from the input connector and to produce regulated power. In addition, the power supply includes a secondary power conversion circuit configured to receive the regulated power through the inlet port and to supply converted power to the device through the output connector. A control circuit is coupled to the secondary power conversion circuit and is configured to determine a power requirement of the device and to operate the secondary power conversion circuit to produce converted power having a parameter based upon the power requirement.

Furthermore, embodiments of the present invention relate to a method of powering a device using power from a source. The method includes the steps of receiving power from the source, determining a power requirement of the device, converting the power to produce converted power having a parameter based on the power requirement, and supplying the converted power to the device.

Preferably, the power requirement determined by the embodiments of the present invention is a charging requirement of a battery of the device. However, in some embodiments, the power requirement is an operational power requirement.

BRIEF DESCRIPTION OF THE DRAWINGS

FIG. 3A illustrates a power coupling of an adapter that is included in a universal power supply in accordance with some embodiments of the present invention.

FIG. 3B illustrates an interface between a power module and an adapter in accordance with some embodiments of the present invention.

FIG. 6 is in isometric view of an input cable and an output connector for use with a universal power supply in accordance with some embodiments of the present invention.

DETAILED DESCRIPTION OF THE PRESENT INVENTION

The present invention is directed to a universal power supply for a device. The power supply includes a control module configured for determining a power requirement of a device. Based upon the power requirement, the universal power supply provides power to the device in accordance with the requirement of the device. The phrase "power requirement" as used throughout this document refers to any requisite, need, condition, necessity, setting, or requirement that affects, aids, helps, or enhances the powered operation of a device. Preferably, a power requirement is a requirement regarding the voltage or current necessary to properly power the device such that the device is operational. Thus, the present invention encompasses embodiments in which the universal power supply can supply power to a device such that the device can be powered on and remain operational.

The power requirement can also refer to the requirement for charging a battery of a device, such that the battery can store power for the device to be operational when the device is powered on but not connected to a supply other than the battery. In this case, the power requirement is sometimes referred to herein as a "charging requirement". Further, the present invention encompasses embodiments in which the universal apparatus can supply power to a battery in a device, such that the battery stores power for the device, so that the device can be powered on. Preferably, the present invention supplies power to the battery, such that the battery stores power to the full capacity of the battery, for the device to remain operational while utilizing the battery power, thereby enhancing the portability of the device.

One skilled in the art will appreciate that the present invention is not limited to determining or detecting only one power requirement of the device. The present invention is also intended to encompass any apparatus, device, or mechanism that configures itself to supply power to a device based upon one or more power requirements of the device. This invention thus eliminates the need for multiple adapters designed to power or charge devices at a specific voltage requirement. The disclosed universal power supply can charge any device based upon the power requirement(s) specific to the device. The universal power supply can be used to charge or run different devices having different power requirements, one at a time.

Power Supply Overview

Figure 1A:
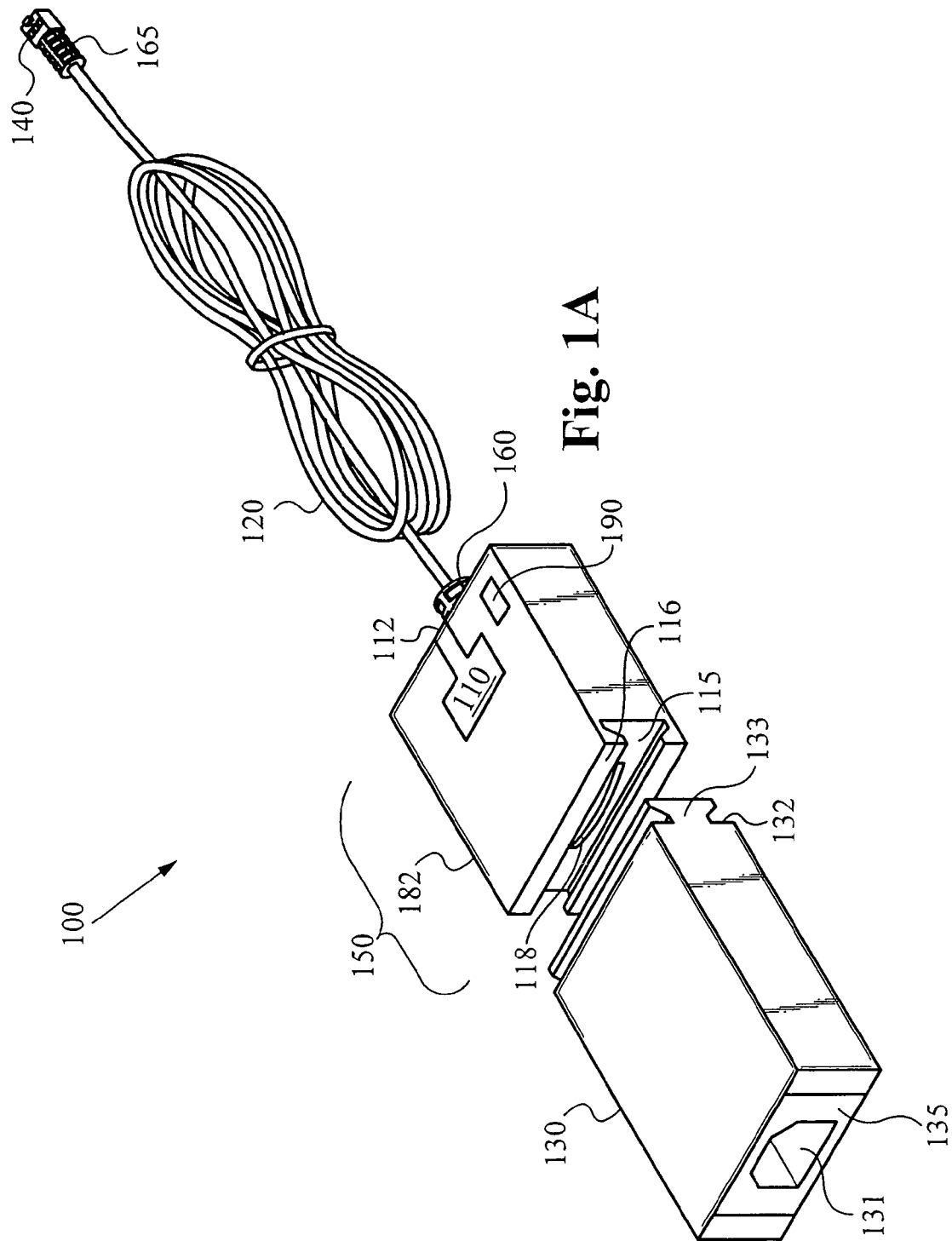
FIG. 1A illustrates a universal power supply in accordance with some embodiments of the present invention.
Figure 1B:
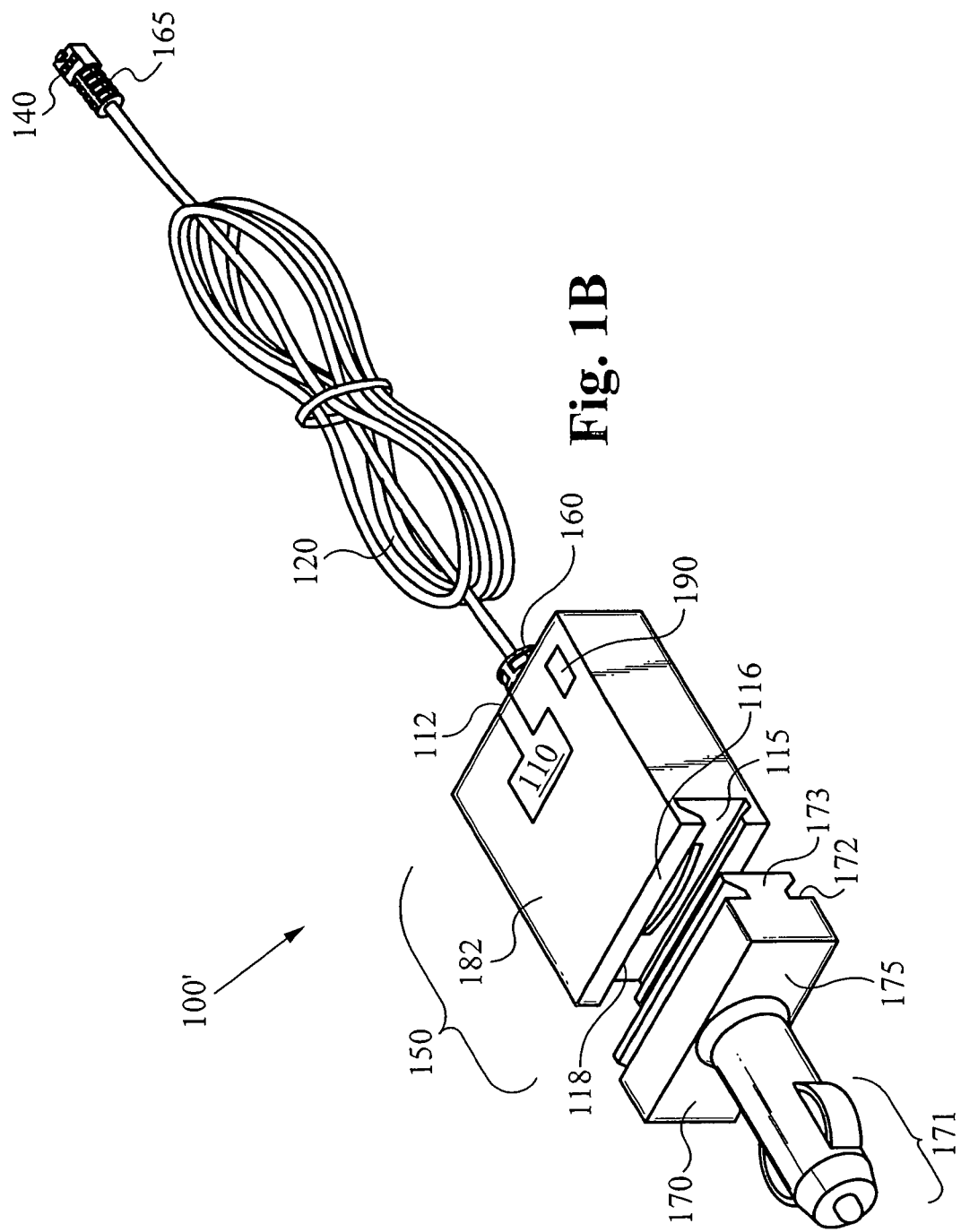
FIG. 1B illustrates a universal power supply in accordance with some embodiments of the present invention.

FIGS. 1A and 1B show a universal power supply. The universal power supply is an assembly comprising an output module 150 and an input adapter, e.g. 130 or 170. The supply is adapted to provide power to a variety of electronic devices. In some embodiments, a universal supply is configured to supply power to multiple electronic devices simultaneously. Some embodiments of the invention are configured to supply power to charge a battery of an electronic device. The preferred embodiment is configured to supply power having a parameter based upon a requirement of a battery-powered electronic device to which it is coupled.

Still referring to FIGS. 1A and 1B, the universal power supply includes a charger module 150, a cable 120, and an adapter, e.g. 130 (FIG. 1A) or 170 (FIG. 1B). Embodiments of the present invention provide a variety of different adaptors for inclusion within a universal power supply. For example, the adapter 130 is an AC-DC adapter, while the adapter 170 is a DC-DC adapter. However, one skilled in the art will appreciate that the present invention encompasses a universal power supply having any type of power supply coupled to the output module 150. Furthermore, it will be apparent to one skilled in the art that one or more elements of the universal power supply can be eliminated without departing from the spirit and the scope of the present invention.

The output module 150 includes elements configured to convert power received from an adapter, e.g. 130 or 170, and elements configured to control operation of the power conversion elements. Preferably, the output module 150 includes an automatic digital controller as a control element. In addition, the output module 150 preferably includes a means for sensing at least one power requirement of a device to which it is connected. The cable 120 is adaptable to couple the output module 150 to the device 200. Preferably, the cable 120 includes a first end 160 and a second end 165. Preferably, the first end 160 of the cable 120 is configured to be coupled to the output module 150. Preferably, the second end 165 of the cable 120 is configured to be coupled to an output connector 140.

The output connector 140 is operatively coupled to the cable 120, such that power is delivered from the power supply to the output connector 140 through the cable 120. The output connector 140 has at least one outlet, e.g. 143 of FIG. 8, for coupling a device to the universal power supply.

The present invention further encompasses some embodiments in which an output module alone can receive power from a power supply and deliver power to a device, without the need for the output module being coupled an adapter, e.g. 130 or 170, and/or a cable, e.g. 120. The present invention encompasses embodiments which allow for the output module to operate independently such that it can self-configure to receive power from a power supply and deliver power to a device.

Exemplary Device

Figure 12:
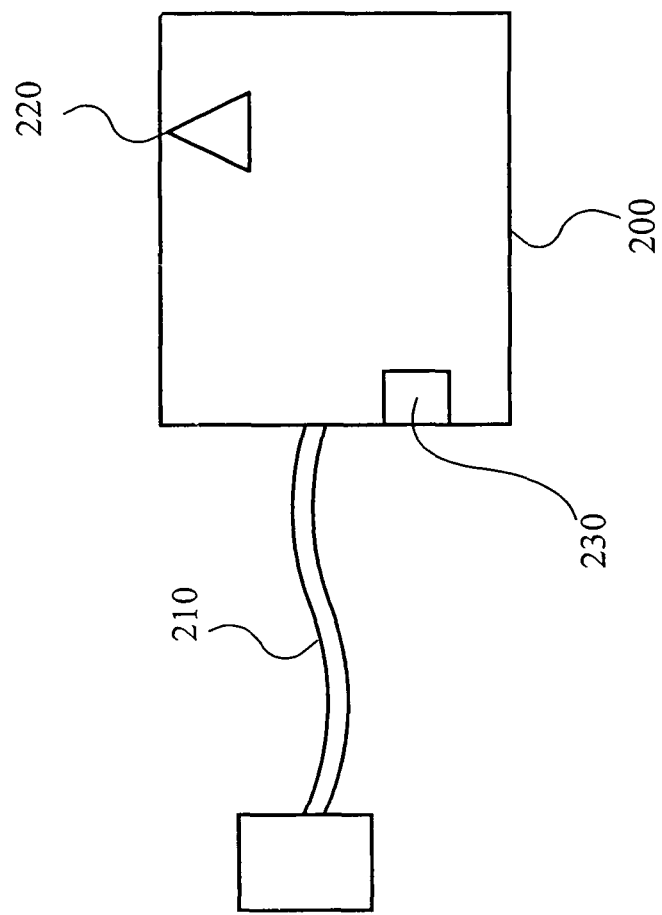
FIG. 12 is a schematic representation of a device to which power is supplied by a universal power supply in accordance with some embodiments of the present invention.

FIG. 12 illustrates an exemplary device 200 powered by the battery 220 and power cord 210. Some embodiments of the present invention are configured to supply power through the power cord 210 to charge the battery 220.

The device 200 is preferably a portable electronic device. Most preferably, the device is any one of the following but only one at a time: personal computer, a laptop or notebook computer, a cellular phone, a personal digital assistant, a personal entertainment device, a music entertainment device, a personal gaming system, a wireless device, a digital camera, a video camera, an electronic device, or a handheld device. However, this list is not meant to be exhaustive. For example, devices that are combinations of the above-listed elements are contemplated by the present invention.

Details

Preferably, the output module 150 includes a housing 110, which preferably comprises a durable material for extended use and wear, such as plastic, thermoplastic, metal, metal alloy, and any combination thereof. This list is not intended to be an exhaustive list. Further, the housing 110 is designed to protect internal components of the output module 150 from external elements, including but not limited to heat, dust, dirt, moisture, light and the like, and also to provide venting as required.

In some embodiments, the housing 110 includes an indicator 190 mounted to the housing 110 Preferably, the indicator 190 is an LED indicator. However, the present invention encompasses all types of indicators and alerts, including but not limited to visual indicators, audio indicators, mechanical indicators, vibrating indicators, tactile indicators, and any combination thereof. The indicator 190 can also be located or mounted anywhere on the universal power supply.

Preferably, the indicator 190 is configured to indicate when the output module 150 is ready to supply power to a device, e.g 200 of FIG. 12. Alternatively, the indicator 190 is configured to indicate when power from the power supply is properly received by the output module 150. Alternatively, the indicator 190 can indicate when an adapter, e.g. 130 or 170 is coupled to the output module 150. The indicator 190 can indicate when the universal power supply has configured itself to deliver power to the device 200 based on the power requirement of a device, e.g. 200 of FIG. 12. Alternatively, the indicator 190 can indicate when the universal power supply has finished charging the battery 220 of a device, e.g. 200 of FIG. 12. The indicator 190 can also be programmable. The indicator 190 can also perform any combination of the preceding functions.

It will be apparent to those skilled in the art that more than one indicator 190 can be mounted on the housing 110, and more than one type of indicator 190 can be used for the universal power supply, depending upon the application at hand FIGS. 1A and 1B, which show the LED indicator 190 on the housing 110 of the output module 150, are exemplary only and are not intended to limit the scope of the present invention.

Operation

Preferably, the output module 150 includes a control module that implements an algorithm to determine a power requirement of a device, e.g. 200 of FIG. 12. During operation, the output module 150 receives power from a source. For example, an AC-DC connected to a wall outlet or a DC-DC power adapter coupled to a battery source.

The output module 150 determines the power requirement of a device 200 coupled to the output module 150. Preferably, the output module 150 senses, determines, and/or processes the voltage charging requirement of a battery of a device, e.g. 200 of FIG. 12. Preferably, the output module 150 receives a signal from the device 200, and determines the charging requirement based on that signal. Preferably, the signal is the current drawn by the device as the output module 150 provides power at a given voltage.

In some embodiments, the output module 150 receives the signal directly from the device 200. Alternatively, the signal is received by the output module 150 through an intermediary or medium, such as through the port 112 such that the signal is measured to sense changes caused by the device 200. In some embodiments, the output module 150 receives the signal from the device 200 through the cable 120. It will be appreciated that the output module 150 can receive the signal from a device through a variety of mechanisms which are not listed herein.

In some embodiments, the method by which the output module 150 determines a power requirement of a device comprises steps of supplying power to the device at an initial voltage and tracking the current drawn by the device while incrementing the voltage at a first rate. The output module 150 preferably includes means for incrementing voltage at a first rate.

In some embodiments, an algorithm implemented by the charger 150 comprises a step of changing a parameter of the power supplied to a device in response to a change in the electric current drawn by the device. Thus, the output module 150 preferably includes means for determining a change in the signal received from a device, e.g. 200 of FIG. 12. The output module 150 can be configured to monitor the current as an analog signal or include an A-D convertor and monitor the current as a digital signal.

Once the output module 150 detects a change in the signal received from the device 200, the output module 150 processes this signal. In some embodiments, the output module 150 determines the power requirement of a device, e.g. 200 of FIG. 12, based upon the change in signal. For example, in some embodiments, once the output module 150 detects a change in the signal from the device 200, the output module 150 then determines that it has the correct voltage charging requirement of a device, and delivers power based on the determined power requirement. In other embodiments, a change in the signal prompts the output module 150 to change the rate at which the voltage is incremented, and continue tracking the current drawn by the device while incrementing the voltage. Some embodiments include several cycles in which a change in signal prompts a change in the rate at which the supply voltage is incremented, and continued monitoring.

In each case, the output module 150 determines a power requirement of a device based upon the supply voltage, signal change, and/or signal magnitude. In the preferred embodiments, the power requirement is a charging requirement that corresponds to the supply voltage required by a battery of a device, the output module 150 self-configures to charge the battery of or operate the device at its required voltage.

Preferably, the output module 150 sets the voltage based upon the charging requirement, such that power is delivered to the device, sufficient to properly charge the device. The output module 150 also includes means for setting voltage based upon the charging requirement of a device, e.g. 200 of FIG. 12. Alternatively, the output module 150 can configure or program itself to output voltage at a fixed setting, such that power is sent by the output module 150 to a device, e.g. 200 of FIG. 12, at an appropriate voltage consistent with the voltage charging requirement of a device, e.g. 200 of FIG. 12. The output module 150 preferably includes an automatic digital controller, for ease in monitoring the signal from a device.

The output module 150 also can include means for sensing a power current received from the power supply. Thus, the output module 150 can detect whether the power being received from the power supply is AC power or DC power. If the output module 150 detects that the power being received from the power supply is AC power, the output module 150 can self-configure to transform the AC power to DC power, such that the power being supplied to a device, e.g. 200 of FIG. 12, coupled to the output module 150 is DC power. Alternatively, if the output module 150 detects that the power being received from the power supply is DC power, then the output module 150 determines that no transformation of the power is necessary prior to supplying the DC power to a device, e.g. 200 of FIG. 12, coupled to the output module 150.

Adapters

Preferably, the output module 150 receives power from a power source, such as an AC-DC power supply coupled to an electrical wall outlet or a DC-DC power supply coupled to a battery. These examples are not intended to be exhaustive. It will be apparent to one skilled in the art that the AC power supply and/or the DC power supply can be accessed by the output module 150. The output module 150 preferably includes a port 112 for supplying power to a device, e.g. 200 of FIG. 12, coupled to the output module 150. The output module 150 is further configured to determine a power requirement of the device coupled to the output module 150. Preferably the device is a portable electronic device.

Figure 2A:
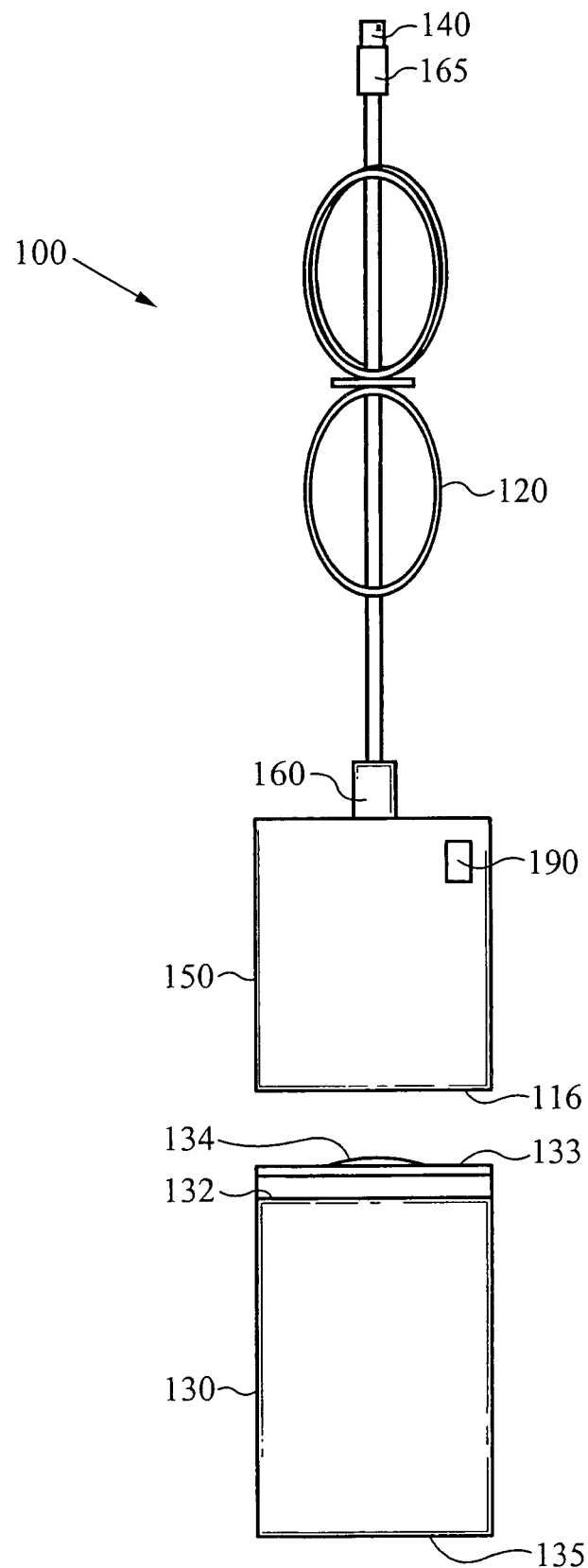
FIG. 2A is a plan view a universal power supply including in accordance with some embodiments of the present invention.

FIG. 1A shows the universal power supply having an AC adapter 130. Preferably, the AC adapter 130 includes a first end 132 and a second end 135. Preferably, the second end 135 is spaced apart from to the first end 132 of the AC adapter 130. The first end 132 of the AC adapter 130 is configured to slidably couple mechanically and electrically to the output module 150. The second end 135 includes a coupling 131. Preferably, the coupling 131 is an AC plug configured to couple to an AC power supply, such as a wall outlet or to receive a power cord coupled to a wall outlet. FIG. 2A shows the same universal power supply of FIG. 1A with the AC adapter 130 from a different angle. Specifically, FIG. 2A illustrates the universal power supply of FIG. 1A from a side view angle.

FIG. 3A shows the second end 135 of the AC adapter 130 from a top view. The coupling 131 mounted on the second end 135 of the AC adapter 135 includes a plurality of adapter prongs 133. FIG. 3A shows the second end 135 having three adapter prongs 133 that are conventionally used for AC adapters. However, it will be apparent to those skilled in the art that the number of adapter prongs 133 can be one or more, based upon the application at hand. FIG. 3B shows a view of the AC adapter 130 and the output module 150. The AC adapter 130 and the output module 150 are configured to slidably couple in a sliding assembly. The sliding assembly is discussed below in relation to FIGS. 5A-5E.

Figure 2B:
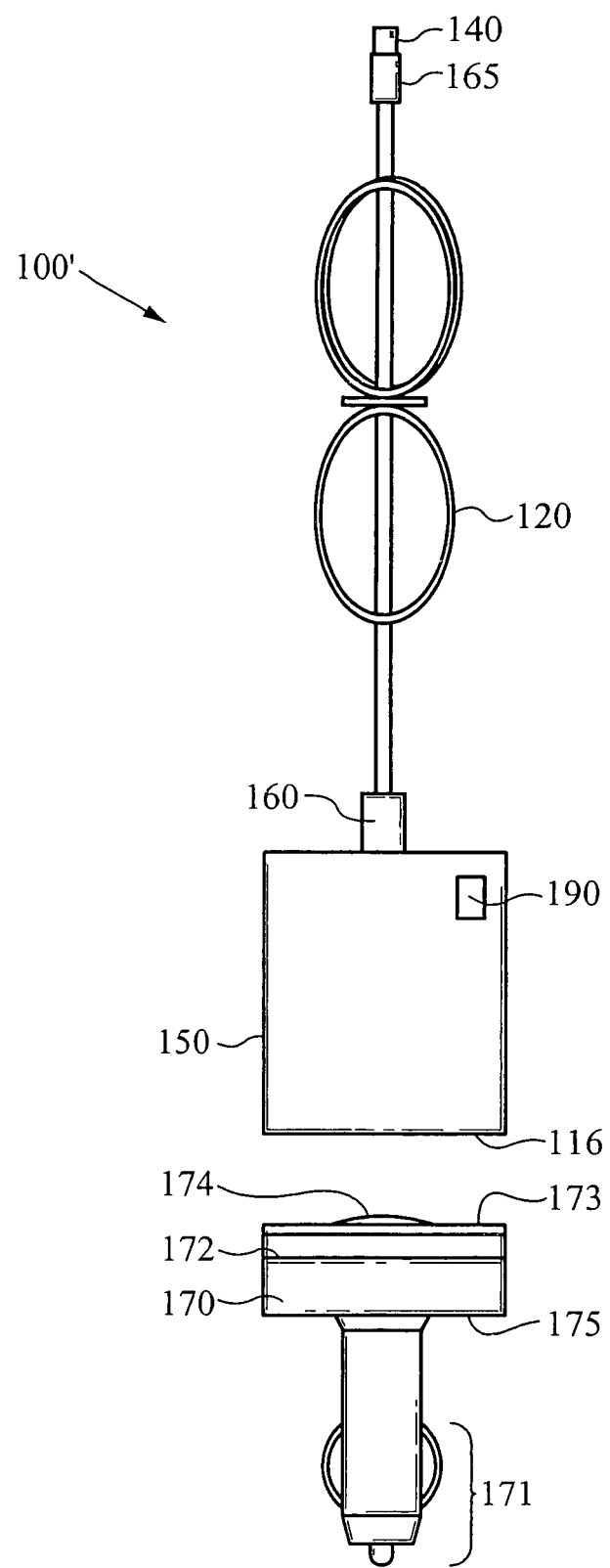
FIG. 2B is a plan view a universal power supply including in accordance with some embodiments of the present invention.

The universal power supply in FIG. 1B includes a DC adapter 170. The DC adapter 170 includes a first end 172 and a second end 175. Preferably, the second end 175 is opposite and parallel to the first end 172 of the DC adapter 170. The DC adapter 170 preferably includes a coupling 171 coupled to a second end 175. The coupling 171 of the DC adapter 170 is configured to couple to a DC receptacle (not shown). Preferably, the coupling 171 is a plug configured to couple to a DC power supply, such as a cigarette lighter receptacle of an automobile. FIG. 2B shows the same universal power supply' of FIG. 1B with the DC adapter 170 from a different angle. Specifically, FIG. 2B illustrates the universal power supply' of FIG. 1B from a side view angle. The DC adapter 170 includes at least one contact member 174 on the first end 172.

Figure 4A:
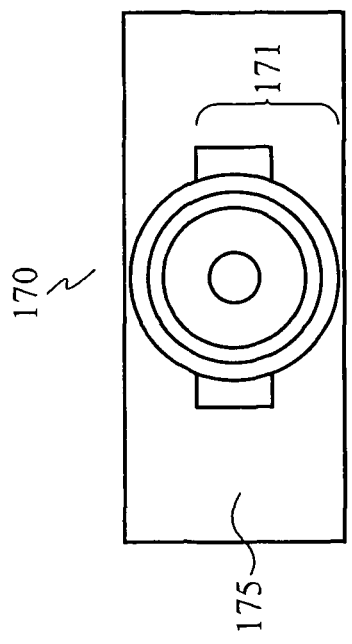
FIG. 4A illustrates a power coupling of an adapter that is included in a universal power supply in accordance with some embodiments of the present invention.
Figure 4B:
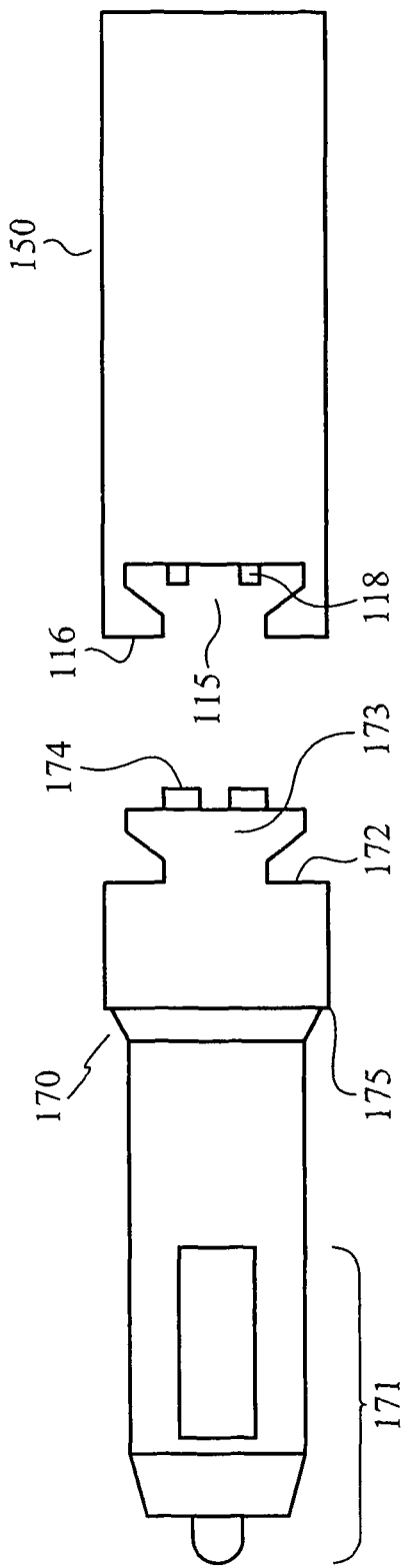
FIG. 4B illustrates an interface between a power supply module and an adapter in accordance with some embodiments of the present invention.

Referring now to FIG. 4A, the second end 175 of the DC adapter 170 preferably includes a metal tip 171 conventionally used to access a DC power receptacle. FIG. 4B shows the DC adapter 170 and the output module 150 from a side view. The DC adapter 170 and the output module 150 are configured to slidably couple in a sliding assembly.

Interface

The output module 150 and the adapter, e.g. 130 or 170, are elements of a sliding assembly of the universal power supply. FIGS. 5A, 5B, 5C, 5D, and 5E illustrate the coupling between the output module 150 and the adapter at various stages of assembly. The DC adapter 170 is used as an exemplary adapter throughout FIGS. 5A-5E. It will be apparent to those skilled in the art that the DC adapter 170 of the sliding assembly shown in FIGS. 5A-5E can be substituted with the AC adapter 130 (FIG. 1A).

Figure 5A:
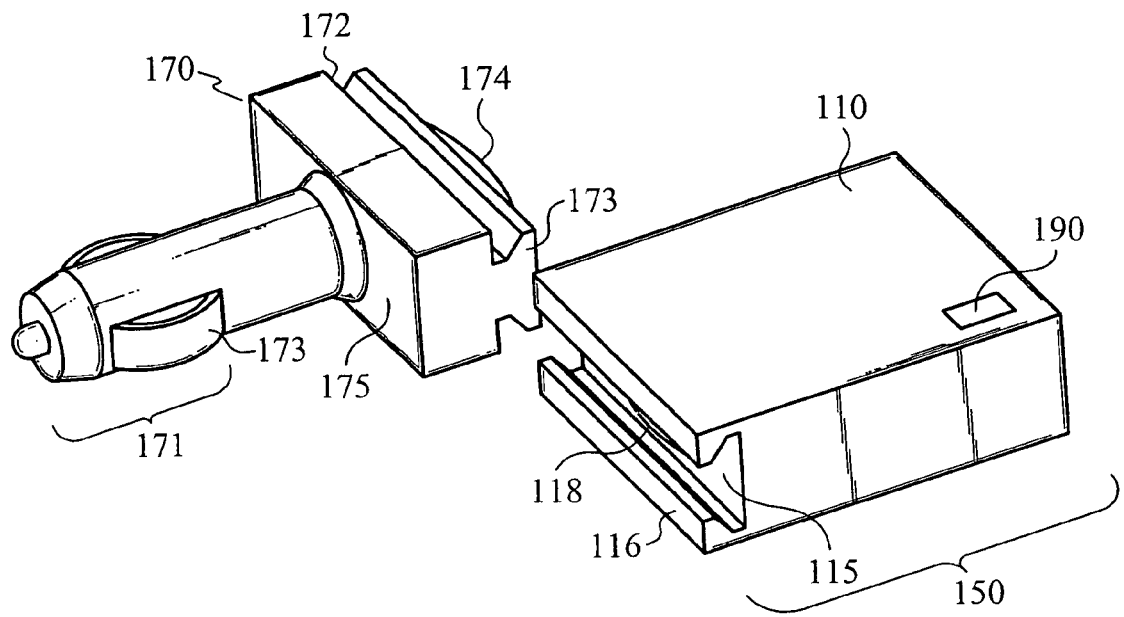
FIGS. 5A, 5B, 5C, 5D, and 5E are isometric views of an interface between an adaptor and a power supply module in accordance with some embodiments of the present invention.

As shown in FIG. 5A, the output module 150 is configured to slidably couple with the DC adapter 170. The output module 150 preferably includes the housing 110, the indicator 190, and a front face 116 configured to slidably couple with the DC adapter 170. The front face 116 of the output module 150 preferably includes a channel 115 for mechanically joining the elements as well as at least one contact member 118 for electrically coupling the elements. The channel 115 of the output module 150 allows for the output module 150 to slidably couple to a first end 172 of the adapter 150. Preferably, the first end 172 of the DC adapter 170 is configured to protrude, such that the first end 172 can slidably couple with the front face 116 of the output module 150 with the help of the channel 115 of the output module 150. Preferably, the first end 172 of the DC adapter 170 includes at least one contact member 174.

In FIG. 5A, the DC adapter 170 and the output module 150 are completely decoupled, with the first end 172 of the DC adapter 170 facing the channel 115 of the front face 116 of the output module 150. Preferably, the indicator 190 at FIG. 5A is inactive, indicating that the sliding assembly is not complete. Alternatively, the indicator 190 at FIG. 5A is inactive as the contact members 174 and 118 of the DC adapter 170 and the output module 150, respectively, are not in complete contact with each other.

Figure 5B:
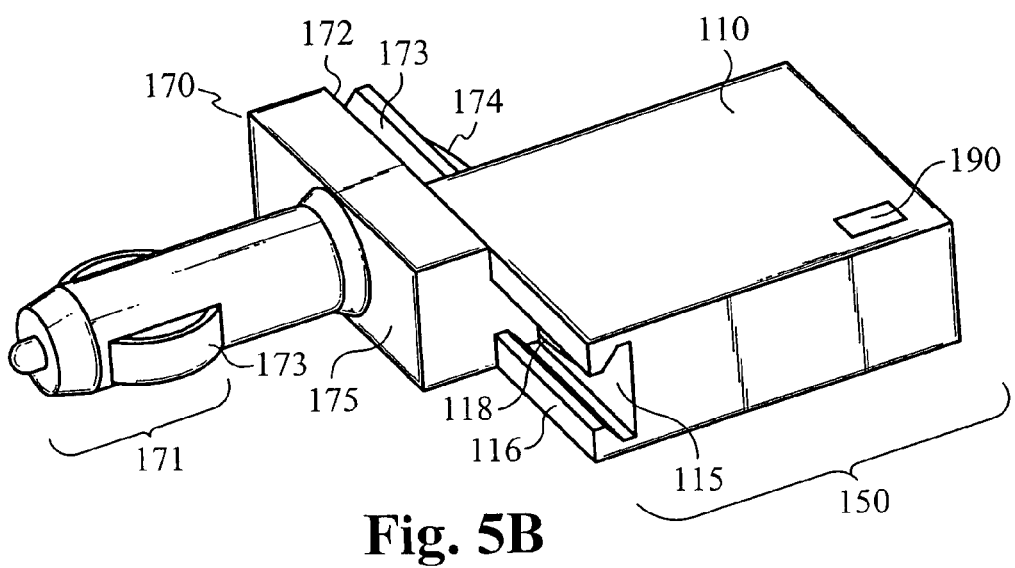

In FIG. 5B, the sliding assembly of the DC adapter 170 and the output module 150 appears to be halfway completed. The sliding assembly in FIG. 5B is partially progressed in FIG. 5B, with the DC adapter 170 and the output module 150 slidably coupled nearly at a midpoint. The DC adapter 170 and the output module 150 are not decoupled from one another, as in FIG. 5A, but the channel 115 is still visible from the outside. In FIG. 5B, the contact members 174 and 118 are also not in complete contact with each other, as the contact members 174 and 118 are partially visible externally. FIG. 5B further shows that the first end 172 of the DC adapter 170 partially coupled with the front face 115 of the output module 150. Preferably, the indicator 117 at the stage shown in FIG. 5B remains inactive, indicating that the sliding assembly is not complete.

Figure 5C:
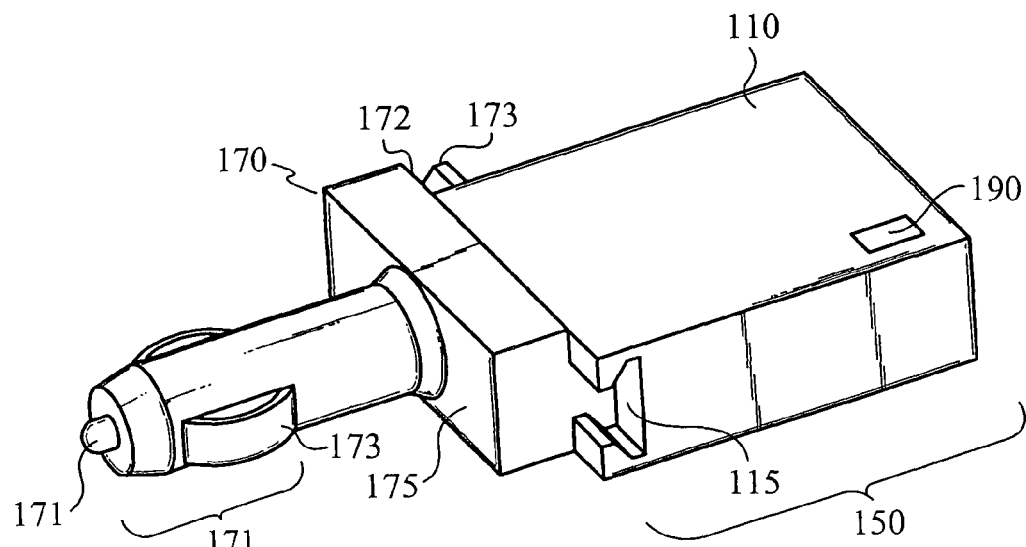
Figure 5D:
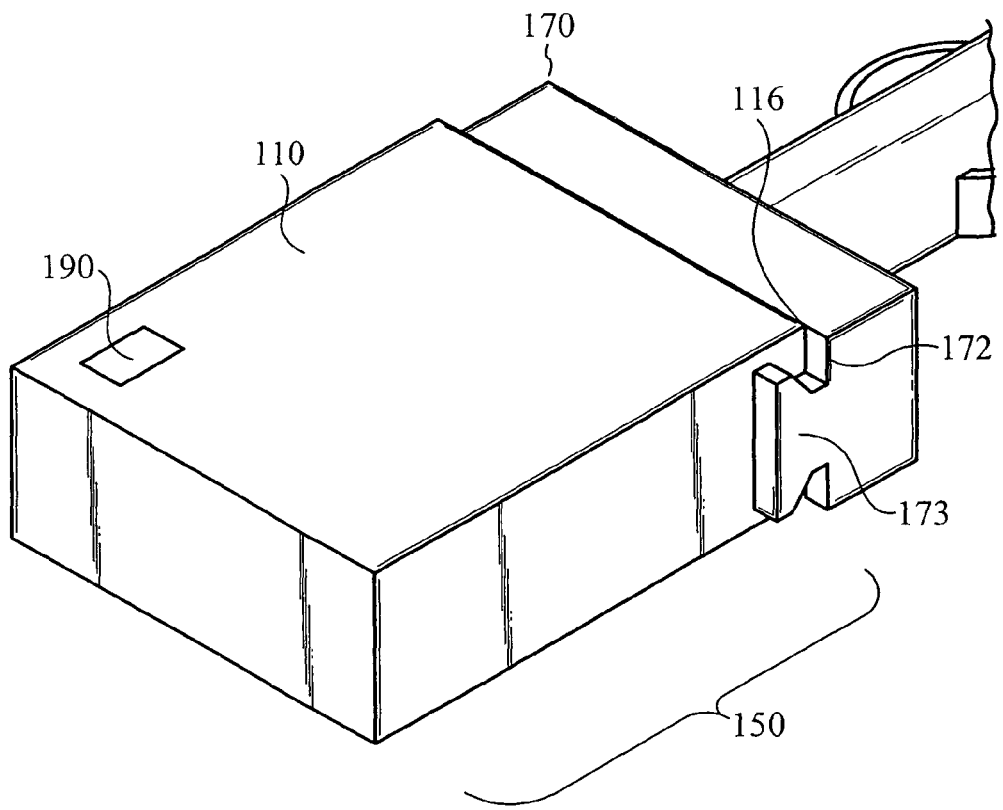

FIG. 5C shows the sliding assembly of the DC adapter 170 and the output module 150 nearly completed. The contact members 174 and 118 of the DC adapter 170 and the output module 150, respectively, are not easily visible, and the contact members 174 and 118 are also not in complete contact with each other. Hence, the indicator 117 in the stage shown in FIG. 5C of the sliding assembly is not active. FIG. 5D shows an enlarged view of the sliding assembly of the DC adapter 170 and the output module 150 as pictured in FIG. 5C, from an angle approximately 180 degrees from the angle shown in FIG. 5C.

Figure 5E:
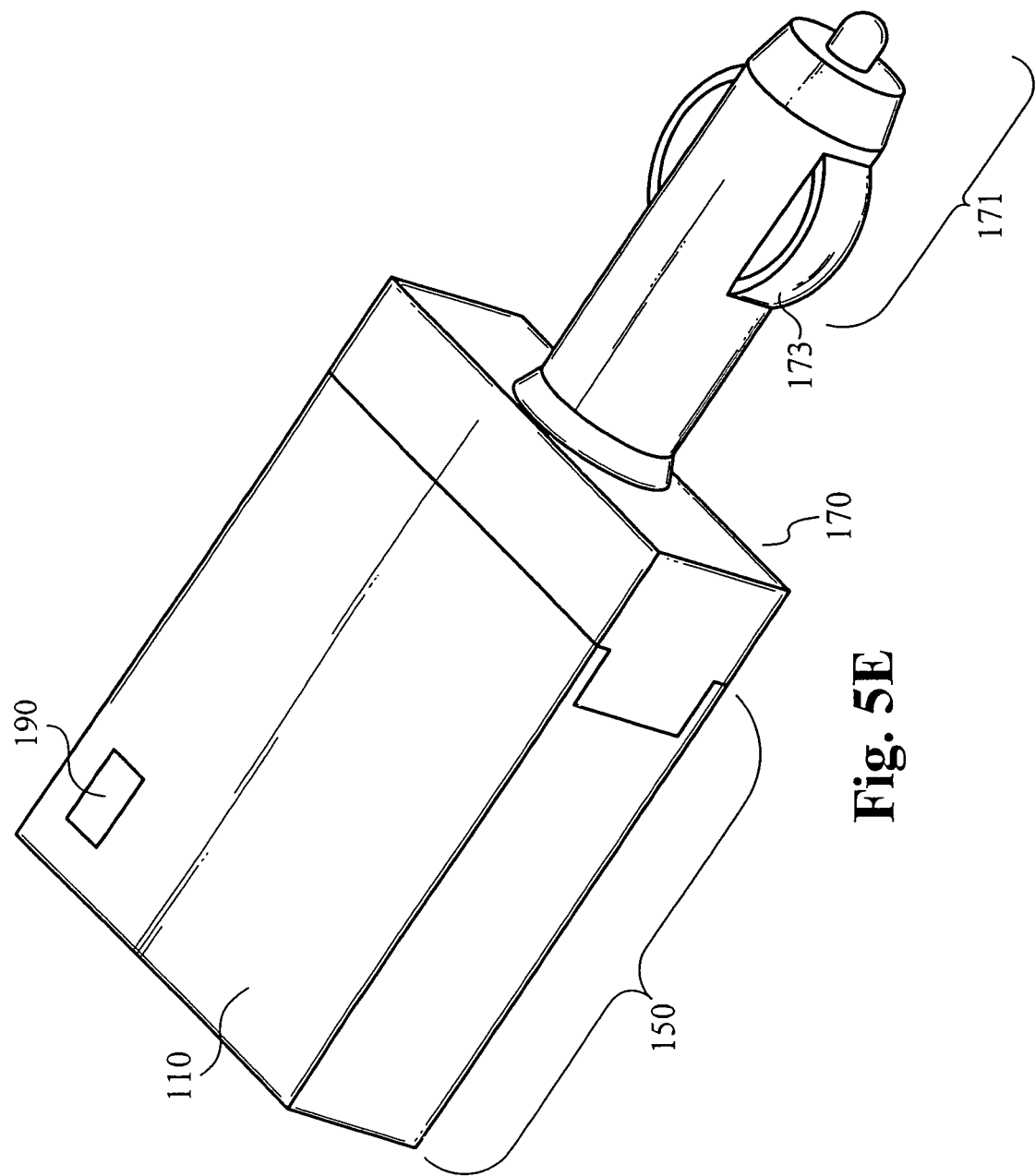

FIG. 5E shows the output module 150 and the DC adapter 170 coupled with one another. The sliding assembly is in its final form in FIG. 5E. The contact members 118 and 174 (FIG. 5A) of the output module 150 and the DC adapter 170, respectively, are in contact with each other and are not visible externally in FIG. 5E. The indicator 190 mounted on the housing 110 of the output module 150 is active in FIG. 5E, as the sliding assembly of the output module 150 and the DC adapter 170 is complete. Preferably, if the DC adapter 170 is coupled to an appropriate power supply, the output module 150 in the output module 150 is coupled to the power supply and thus the output module 150 can receive power from the power supply. The indicator 190 preferably indicates that the output module 150 is receiving power from the power supply. Alternatively, the indicator 190 is activated when the output module 150 is ready to supply power to a device 200 coupled to the output module 150.

Cable

Referring back to FIG. 1A, as discussed previously, the output module 150 preferably includes a cable 120. The cable 120 is configured for delivering power from the output module 150 to a device, e.g. 200 of FIG. 12. The cable 120 is preferably configured to couple the output module 150 and output module 150 and the device. The cable 120 is further configured for transmitting a signal between the output module 150 and the device.

The cable 120 is preferably an input cable configured to input power from the output module 150 to the device. Preferably, the cable 120 allows for power to be delivered from the output module 150 to the device via the port 112. The cable 120 preferably includes a cable wire for transmitting the signal between the output module 150 and the device. The cable 120 is made of a flexible material, such that the cable 120 can extend, twist, and be otherwise maneuvered manually.

FIG. 6 shows the cable 120 in greater detail. The cable 120 includes a first end 160 and a second end 165. The first end 160 of the cable 120 is operatively coupled to the output module 150, such that signals between the output module 150 (FIGS. 1A and 1B) and the device coupled to the cable 120 can be readily transmitted by the cable 120. The first end 160 can further include an optional coupling member 163 configured to couple the first end 160 of the cable 120 to the output module 150 (FIGS. 1A and 1B) housed in the output module 150 (FIGS. 1A and 1B). As depicted in FIGS. 1A and 1B, the first end 160 and the second end 165 of the cable 120 can be enclosed by coverings, such that the first end 160 and the second end 165 of the cable 120 are not exposed to external elements. One skilled in the art will recognize that the specific shape, dimensions, material, and design of the cable 120 and its components will depend upon the application at hand.

Figure 7:
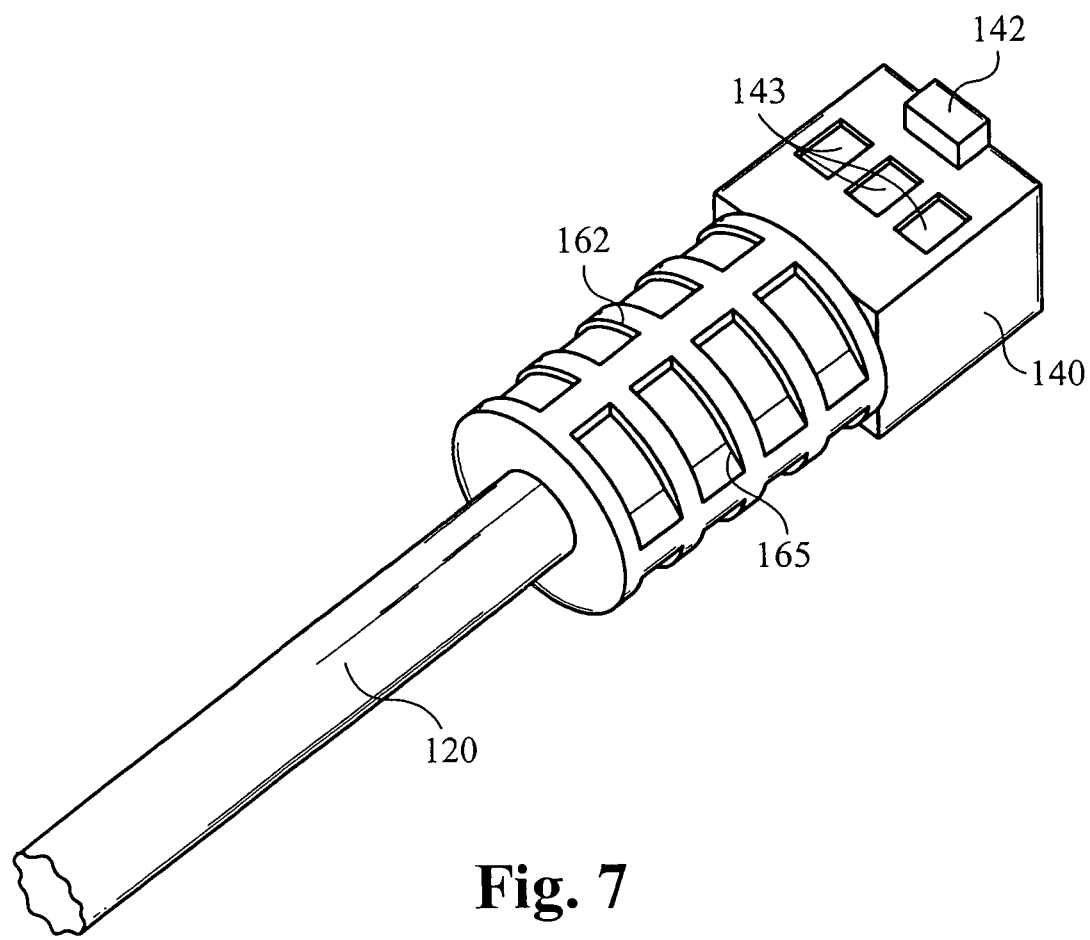
FIG. 7 is an isometric view of an input cable and power connector for use with a universal power supply in accordance with some embodiments of the present invention.
Figure 8:
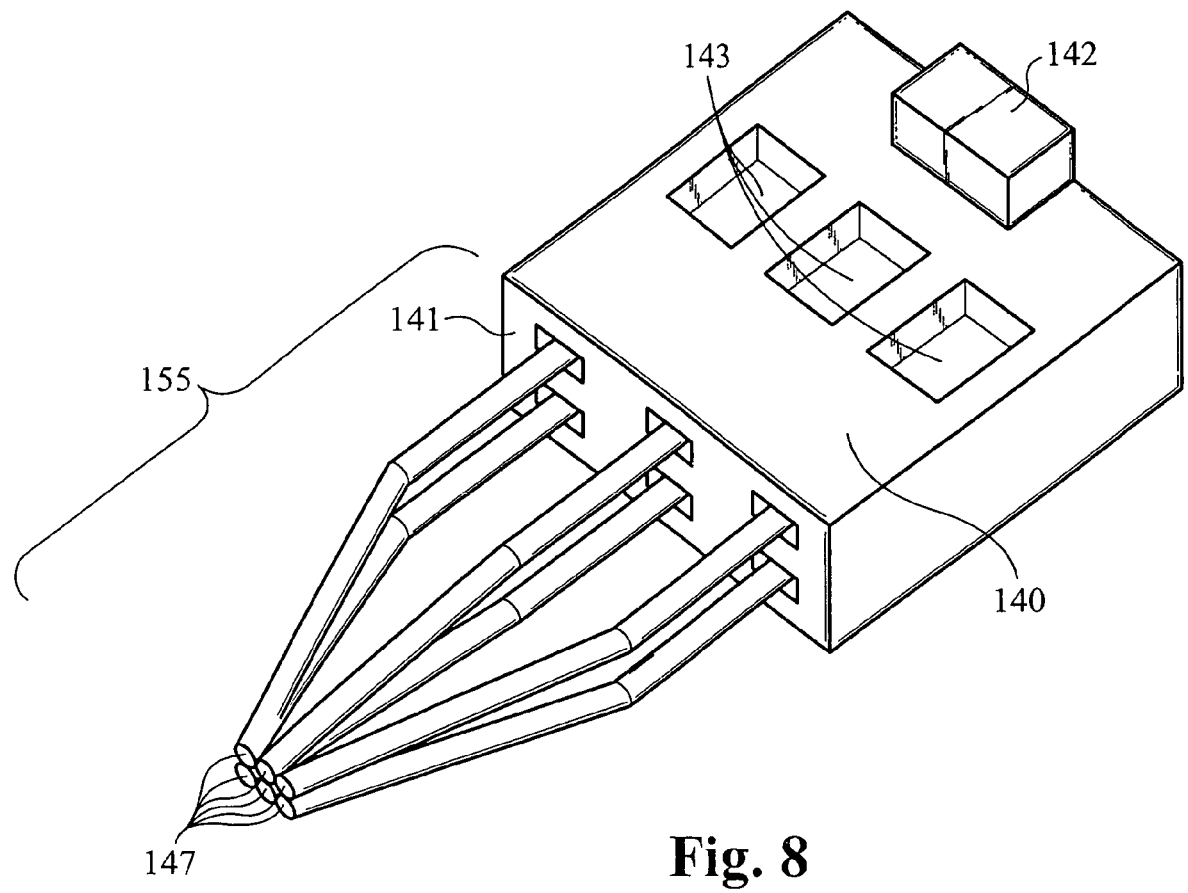
FIG. 8 is an isometric view of the output connector for use with a universal power supply in accordance with some embodiments of the present invention.

FIG. 7 shows the second end 165 of the cable 120 and the output connector 140. The second end 165 can include a protective covering 162. FIG. 8 shows the second end 165 without the protective covering 162 (FIG. 7). In some embodiments there can be multiple conductors within the cable each coupled to a separate output port. Alternatively, other embodiments can use a single cable pair and couple the parts in parallel.

As discussed previously, the output connector 140 is configured to couple the output module 150 (FIGS. 1A and 1B) to the device. The output connector 140 includes at least one output 143 to output power from the output module 150 to the device. The output connector 140 can also include a mating element 142 to lock in or hold the power cord 210 of the device while it is coupled to the output connector 140.

FIG. 7 depicts the output connector 140 having three outputs 143. However, the present invention is not limited to three outputs 143 for the output connector 140. The present invention can encompass output connectors 140 having one or more outputs 180 without departing from the spirit and the scope of the present invention. It will be appreciated by those having ordinary skill in the art that the number of outputs 143 of the output connector 140 depends upon the application at hand.

FIG. 8 shows the second end 165 of the cable 120 bare without the protective covering 162 (FIG. 7). FIG. 8 shows that without the protective covering 162, a plurality of cable wires 155 is visible, where the cable wires 155 couple the output module 150 to a device 200 coupled to the output connector 140. The cable wires 155 are configured to deliver signals between the output module 150 and a device, e.g. 200 of FIG. 12, coupled to the output connector 140. Preferably, the cable wires 155 run the length of the cable 120 (FIG. 1A) from the first end 160 to the second end 165 of the cable, thereby coupling the output module 150 (FIG. 1A) to the output connector 140. Referring to both FIGS. 1A and 8, the cable wires 155 preferably are configured to deliver power from the output module 150 to the device coupled to the output connector 140. It will be appreciated by those skilled in the art that the present invention encompasses embodiments in which the universal power supply includes one or more cable wires 155, depending upon the application at hand.

Method

Embodiments of the present invention include methods and processes adapted to determine power requirements of electronic devices and to provide power to those devices appropriate to their respective power requirements. Preferably, these processes and methods are performed by a control module of a universal power supply consistent with the present invention. However, in some embodiments, these processes and methods are accomplished by components other than a control module or a universal power supply as described herein.

Figure 10:
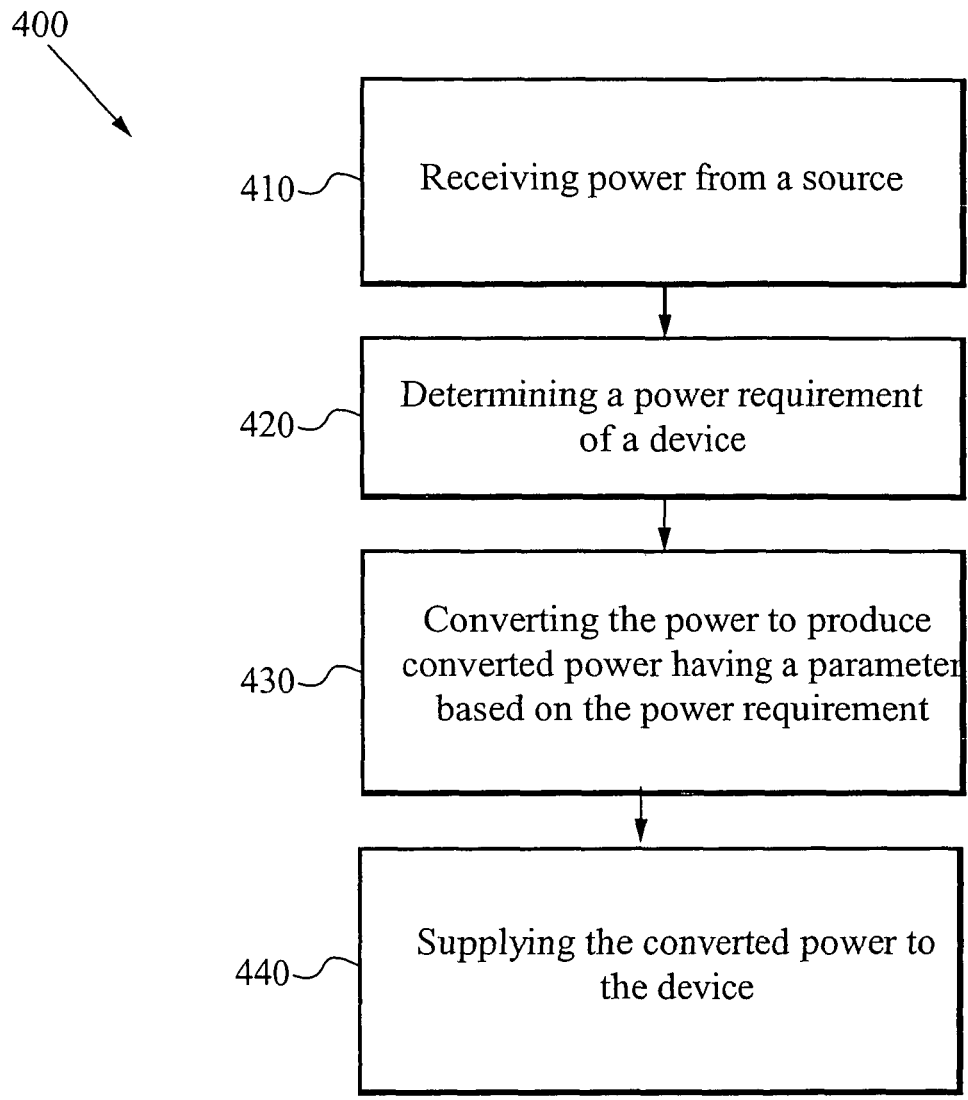
FIG. 10 is a flow chart illustrating a method of supplying power to a device consistent with some embodiments of the present invention.

FIG. 10 is a flowchart illustrating a process 400 of determining a power requirement of a device and providing power to the device appropriate to its power requirement consistent with some embodiments of the present invention. The process includes a series of steps which allow for the universal power supply to gauge a power requirement of a device, and to provide the device power with a parameter based on the power requirement to the device.

In the illustrated embodiment, the process 400 uses power from a source. The process 400 includes a step 410 of receiving power from the source. The process 400 further includes a step 420 of determining a power requirement of the device. In addition, the process 400 includes a step 430 of converting the power to produce converted power having a parameter based on the power requirement. The process 400 also includes a step 440 of supplying the converted power to the device.

Figure 11:
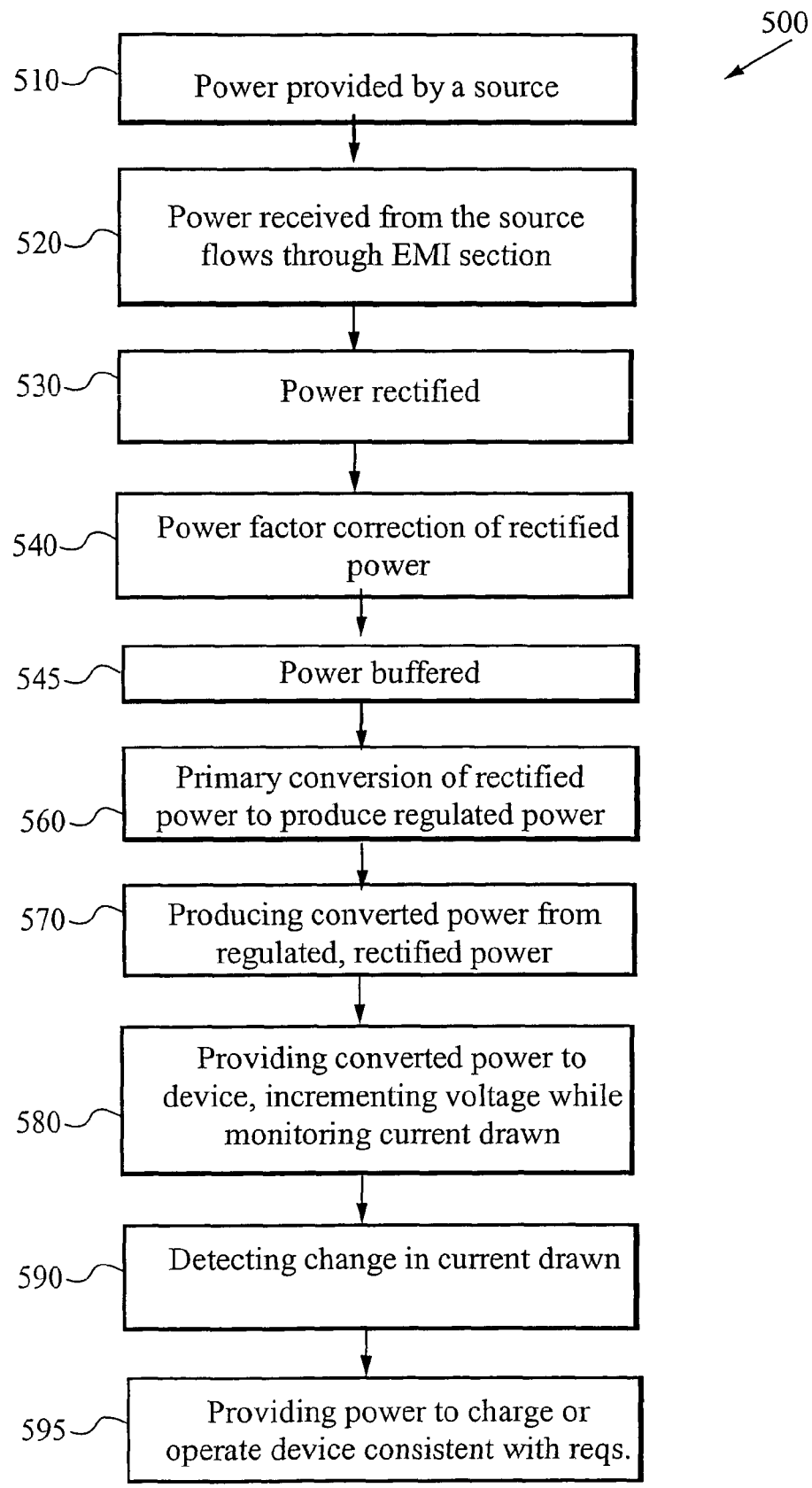
FIG. 11 is a flow chart illustrating a method of supplying power to a device consistent with some embodiments of the present invention.

FIG. 11 is a flowchart illustrating a process 500 of determining a voltage requirement of a device and providing power to the device appropriate to its voltage requirement consistent with some embodiments of the present invention. The process includes a series of steps which allow for the universal power supply to gauge the voltage requirements of a device, and to provide an appropriate voltage to the device based on the voltage requirements. The power requirement is preferably a charging requirement.

The process 500 includes a step 510, in which power flows from or is provided by a power source. Preferably, the power flows from an AC power source. Alternatively, power can flow from a DC power source. Preferably, the AC power enters a universal power supply through an AC terminal socket utilizing an AC adapter having an input of 110V/220V. However, it will be apparent to those skilled in the art that the present invention is not limited to AC adapters and universal power supplies. The present invention allows power to enter the universal power supply through any number of means and/or mechanisms. It will further be appreciated by those skilled in the art that FIG. 11 is exemplary only and that one or more steps in the process 500 can be eliminated without departing from the spirit and the scope of the present invention.

In a further step 520, the power received from the power source preferably flows through an electromagnetic interference (EMI) section. The EMI section preferably filters any anomalies or deters unwanted signals from the sensitive circuitry of the present invention. Preferably, the EMI section is also configured to decrease the amount of possible radiating electromagnetic interference that could disrupt or interfere with other electrical systems. It is apparent that at the step 520, power from the power source can be processed using other mechanisms other than EMI sections, in order to prevent unwanted signals from interfering with one or more surrounding electrical system(s).

After the power is processed by the EMI section at the step 520, preferably the power is rectified at a step 530. Preferably, rectification is performed by using a diode bridge. Preferably, the rectifier at the step 530 converts the AC power to DC power. However, in the case of DC power, the step 530 is bypassed, since no rectification is required. It will be appreciated by those skilled in the art that means other than diode bridges can be used to rectify power.

At a step 540, power factor correction (PFC) is performed. Preferably, PFC is performed by using a power factor controller. The step 540 is optional, and can be performed using active or passive PFC.

At a step 545, power is buffered by a storage capacitor. In some embodiments, the PFC step uses an output of the storage capacitor as part of the PFC process. In some embodiments, no PFC step is performed and the output of the rectifier is coupled directly to a storage capacitor.

The process 500 continues as rectified, optionally factor-corrected, power is provided to a converter. Step 560 involves conversion of rectified power into a form appropriate for use by an output module. Preferably, the rectified power is provided to a converter via a bus structure. However, other means of providing power to the converter are contemplated. Preferably, the process employs a down converter, such as a fly back forward, half bridge, or full bridge converter. Preferably, the conversion step 560 regulates voltage. In the preferred embodiment, the step 560 provides DC power, regulated to 12 volts.

In a further step 570, the process 500 receives the rectified, regulated power into a secondary converter and produces converted power. Preferably, the secondary converter is a buck/boost converter capable of producing either up-regulated or down-regulated power.

The process 500 also includes a step 580 of providing converted power to a device to be charged or powered and incrementing the voltage of the converted power while monitoring the current drawn by the device. Preferably, a digital controller performs this step. Also preferably, the controller begins supplying power at an initial voltage, and increments the voltage at a first rate.

Preferably, the controller allows for voltage to be increased by at least one rate and to be adjusted, reset, or stopped.

The process 500 further includes a step 590 of detecting a change in the current drawn by the device, and supplying power to the device with a voltage based on the power parameters at which the change in current takes place. In some embodiments, a single type of change in the current drawn acts as an indication that the correct power requirement has been determined of the device. In this case, a change in the amperage signal can indicate that power is being sent to the device at the correct voltage requirement.

In other embodiments, multiple types of changes are detected. In some embodiments, one type of change will prompt the controller to change the rate at which the voltage is incremented to a second rate. In some embodiments, another type of change will subsequently prompt the controller to change the rate at which the voltage is incremented to a third rate. A variety combinations of voltage increment rates and changes in current drawn are consistent with the present invention.

Once a signal or combination of signals indicate to the controller that power is being supplied at the correct voltage requirement of the device, the process performs a step 595 of providing power to charge or operate the device consistent with its requirements.

One skilled in the art will recognize what further optional steps can be added to the process 500 in order to provide power having an appropriate voltage to the intended device or battery of a device.

Circuit

Figure 9:
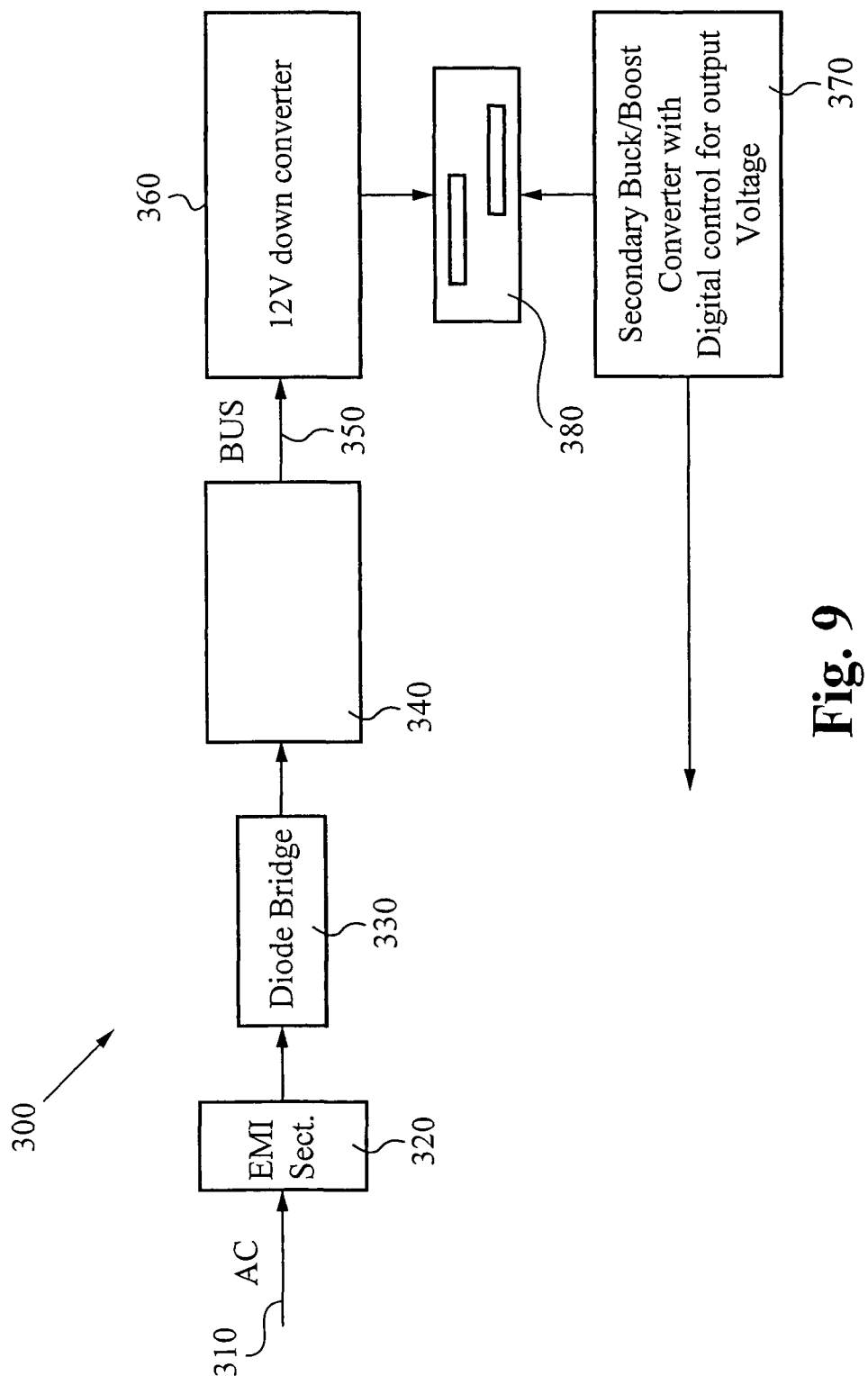
FIG. 9 is a schematic representation of circuitry used in a universal powers supply in accordance with some embodiments of the present invention.

FIG. 9 is a block diagram of an implementation for determining a voltage requirement of a device. Preferably, the circuit includes a control module of a universal power supply. The circuit performs a series of steps which allow for the universal apparatus to gauge the voltage requirements of a device, such that the universal apparatus can self-configure to supply power at an appropriate voltage setting based on the voltage requirements of the device. However, in some embodiments, the process can be accomplished by components other than a control module or a universal apparatus as described herein. Preferably the power requirement is a charging requirement.

The implementation 300 receives power from a source 310. Preferably, the power flows from an AC power source. Alternatively, power can flow from a DC power source. Preferably, the AC power enters a universal power supply through an AC terminal socket utilizing an AC adapter having an input of 110V/220V. However, it will be apparent to those skilled in the art that the present invention is not limited to AC adapters and universal power supplies. The present invention allows power to enter the universal power supply through any number of means and/or mechanisms. It will further be appreciated by those skilled in the art that FIG. 9 is exemplary only and that one or more elements in the implementation 300 can be eliminated without departing from the spirit and the scope of the present invention.

The implementation 300 includes an electromagnetic interference (EMI) section 320. The EMI section 320 preferably filters any anomalies or deters unwanted signals from the sensitive circuitry of the present invention. Preferably, the EMI section 320 is also configured to decrease the amount of possible radiating electromagnetic interference that could disrupt or interfere with other electrical systems.

After the power is processed by the EMI section 320, preferably the power is provided to a rectifier 330. Preferably, the rectifier 330 is a diode bridge. Preferably, the rectifier 330 converts the AC power to DC power. However, in the case of DC power, the rectifier 330 is bypassed, since no rectification is required. It will be appreciated by those skilled in the art that means other than diode bridges can be used to rectify power.

A further element 340 performs either power factor correction (PFC) and power buffering, preferably by using a storage capacitor, or power buffering without PFC. Preferably, the element 340 is a power factor controller with a storage capacitor. The step 340 is optional, and can be performed using active or passive PFC.

A converter 360 transforms rectified power into a form appropriate for use by an output module 370. Preferably, the rectified power is provided to the converter 360 via a bus structure 350. However, other means of providing power to the converter 360 are contemplated. Preferably, the converter 360 comprises a down converter, such as a fly back forward, half bridge, or full bridge converter. Preferably, the converter 360 regulates voltage. In the preferred embodiment, it provides DC power, regulated to 12 volts.

The converter 360 provides rectified, converted power through a connector 380 to an output module 370. Preferably, the output module 370 includes a secondary converter and produces converted power. Preferably, the secondary converter is a buck/boost converter capable of producing either up-regulated or down-regulated power.

The output module 370 provides converted power to a device, e.g. 200 of FIG. 12, and increments the voltage of the converted power while monitoring the current drawn by the device. Preferably, the output module 370 comprises a digital controller that operates the secondary converter to accomplish this function. Preferably, the controller allows for voltage to be increased by at least one rate and to be adjusted, reset, or stopped.

Also preferably, the module 370 begins supplying power at an initial voltage, and increments the voltage at a first rate. Further, the module 370 preferably includes elements adapted to detect a change in the current drawn by the device, and supplying power to the device with a voltage based on the power parameters at which the change in current takes place. In some embodiments, a single type of change in the current drawn acts as an indication that the correct power requirement has been determined of the device. In this case, a change in the amperage signal can indicate that power is being sent to the device at the correct voltage requirement.

In other embodiments, multiple types of changes are detected. In some embodiments, one type of change will prompt the controller to change the rate at which the voltage is incremented to a second rate. In some embodiments, another type of change will subsequently prompt the controller to change the rate at which the voltage is incremented to a third rate. A variety combinations of voltage increment rates and changes in current drawn are consistent with the present invention.

Once a signal or combination of signals indicate to the controller that power is being supplied at the correct voltage requirement of the device, the process performs a step 395 of providing power to charge or operate the device consistent with its requirements.

One skilled in the art will recognize what further optional steps can be added to the process 300 in order to provide power having an appropriate voltage to the intended device or battery of a device.

Preferably, the intermittent connector 380 is a component of the universal power supply described herein. In some embodiments, the universal power supply of FIGS. 1A and 1B uses the implementation 300 of FIG. 9 to determine the power requirement of a device 200 coupled to the universal power supply. In some embodiments, the output module 150 of FIGS. 1A and 1B uses the implementation 300 (FIG. 9) to determine and provide the appropriate voltage based on the power requirement of a device, e.g. 200 of FIG. 12, coupled to the output module 150.

This section makes references to various embodiments of the invention, examples of which are illustrated in the accompanying drawings. While embodiments of the invention have been described, it will be understood that this description is not intended to limit the invention. On the contrary, the invention is intended to cover alternatives, modifications and equivalents, which may be included within the spirit and scope of the invention. Furthermore, in the detailed description of the present invention, numerous specific details have been set forth in order to provide a thorough understanding of the present invention. However, it should be noted that the present invention may be practiced without these specific details. In other instances, well known methods, procedures and components have not been described in detail as not to unnecessarily obscure aspects of the present invention.

What is claimed is:

1. An output module for providing power to a device by using power from a source, comprising:
   a. an inlet port;
   b. an outlet port;
   c. means for receiving a signal from the device;
   d. a power conversion circuit configured to receive power from the source through the inlet port and supply converted power to the device through the outlet port; and
   e. a control circuit coupled to the power conversion circuit and configured to determine a power requirement of the device based on a determination of how the signal received from the device changes in response to adjustment to a voltage signal output to the device from the output module, wherein during the determination of the power requirement the voltage signal output is incremented linearly at a first rate greater than zero, and based upon the change in the signal received the voltage signal output is incremented at a second rate greater than zero, wherein the control circuit operates the power conversion circuit to produce converted power having a parameter based upon the power requirement.

2. The output module of claim 1, wherein the device is one of a personal computer, a notebook computer, a cellular phone, a personal digital assistant, a personal entertainment device, a music entertainment device, a personal gaming system, a wireless electronic device, a digital camera, a video camera, an electronic device, a portable device, a handheld device, an appliance, and any combination thereof.

3. The output module of claim 1, wherein the control circuit comprises an automatic digital controller.

4. The output module of claim 1, further comprising a power supply configured as the source for the output module.

5. The output module of claim 4, further comprising a cable configured for delivering power from the output module to the device.

6. The output module of claim 5, wherein the cable is further configured for transmitting a signal between the output module and the device.

7. The output module supply of claim 4, wherein the power supply is one of an alternating current power supply and a direct current power supply.

8. The output module of claim 4, wherein the control circuit is coupled to the power supply through an adapter.

9. The output module of claim 8, wherein the adapter is one of an alternating current power input adapter and a direct current power input adapter.

10. The output module of claim 4, wherein the output module further comprises means for sensing a power current received from the power supply.

11. The output module of claim 10, wherein the power current comprises one of alternating current and direct current.

12. The output module of claim 4, wherein the output module and the power supply are coupled via an adapter interface.

13. The output module of claim 12, wherein the adapter interface comprises a surface configured to slidably couple the output module and the power supply.

14. The output module of claim 13, wherein the surface of the adapter interface comprises a channel.

15. The output module of claim 14, wherein the power requirement is a charging requirement of a battery of the device.

16. The output module of claim 1, wherein the output module is configured to determine the power requirement automatically.

17. The output module of claim 1, wherein the output module is configured to determine the power requirement according to sensed power consumption.

18. The output module of claim 1, wherein the output module is configured to determine a plurality of subsequent changes to the signal received from the device.

19. The output module of claim 18, wherein during the determination of the power requirement at least one of the subsequent changes in the signal received from the device prompts a subsequent change in the voltage signal output rate.

20. A universal power supply, comprising:
   a. an input connector configured to couple with a power source;
   b. an output connector configured to couple with a device;
   c. a primary power conversion circuit configured to receive power from the input connector and to produce regulated power;
   d. a secondary power conversion circuit configured to receive the regulated power through the input connector and supply converted power to the device through the output connector;
   e. a control circuit coupled to the secondary power conversion circuit and configured to determine a power requirement of the device based on a determination of how a signal received from the device changes in response to adjustment to a voltage signal output to the device, wherein during the determination of the power requirement the voltage signal output is incremented linearly at a first rate greater than zero, and based upon the change in the signal received the voltage signal output is incremented at a second rate greater than zero, wherein the control circuit operates the secondary power conversion circuit to produce converted power having a parameter based upon the power requirement; and f. means for receiving the signal from the device.

21. The universal power supply of claim 20, wherein the power requirement is a charging requirement of a battery of the device.

22. The universal power supply of claim 20, wherein the universal power supply is configured to determine a plurality of subsequent changes to the signal received from the device.

23. The universal power supply of claim 22, wherein during the determination of the power requirement at least one of the subsequent changes in the signal received from the device prompts a subsequent change in the voltage signal output rate.

24. A method of powering a device using power from a source, comprising:
  a. receiving power from the source;
  b. receiving a signal from the device;
  c. determining a power requirement of the device with a control circuit based on determining how the signal received from the device changes in response to adjustment to a voltage signal output to the device, wherein during the determination of the power requirement the voltage signal output is incremented linearly at a first rate greater than zero, and based upon the change in the signal received the voltage signal output is incremented at a second rate greater than zero;
  d. dynamically reacting to the power requirement of the device, thereby converting the power to produce converted power having a parameter based on the power requirement; and
  e. supplying the converted power to the device.

25. The method of claim 24, wherein the power requirement is a charging requirement of a battery of the device.

26. The method of claim 24, wherein a plurality of subsequent changes to the signal received from the device are determined.

27. The method of claim 26, wherein during the determination of the power requirement at least one of the subsequent changes in the signal received from the device prompts a subsequent change in the voltage signal output rate.

28. A system for supplying power comprising:
  a. means for receiving power from a source;
  b. means for determining a power requirement for a device based on determining how a signal received from the device changes in response to adjustment to a voltage signal output to the device, wherein during the determination of the power requirement the voltage signal output is incremented linearly at a first rate greater than zero, and based upon the change in the signal received the voltage signal output is incremented at a second rate greater than zero;
  c. means for dynamically reacting to the power requirement of the device to thereby convert power to produce converted power having a parameter based on the power requirement of the device;
  d. means for supplying the converted power to the device; and
  e. means for receiving the signal from the device.

29. The system for supplying power of claim 28, wherein the device is one of a personal computer, a notebook computer, a cellular phone, a personal digital assistant, a personal entertainment device, a music entertainment device, a personal gaming system, a wireless electronic device, a digital camera, a video camera, an electronic device, a portable device, a handheld device, an appliance, and any combination thereof.

30. The system for supplying power of claim 28, wherein the power requirement is a charging requirement of a battery of the device.

31. The system of claim 28, wherein the means for determining the power requirement determine a plurality of subsequent changes to the signal received from the device.

32. The system of claim 31, wherein during the determination of the power requirement at least one of the subsequent changes in the signal received from the device prompts a subsequent change in the voltage signal output rate.

* * * * *